United States Patent Office 3,390,164
Patented June 25, 1968

3,390,164
CHLORINATED POLYISOCYANATE COMPOSITIONS AND PREPARATION THEREOF
Melvin Kaplan, Tonawanda, N.Y., and Joseph A. Arcesi, Dover, N.J., assignors to Allied Chemical Corporation, New York, N.Y., a corporation of New York
No Drawing. Filed Oct. 11, 1965, Ser. No. 494,913
6 Claims. (Cl. 260—453)

This invention relates to novel halogenated polyisocyanate compositions and more particularly to novel halogenated organic polyisocyanate compositions especially useful in the manufacture of fire-resistant cellular urethane foamed products.

Organic polyisocyanates, particularly aromatic polyisocyanates having a benzene nucleus, such as phenylene diisocyanates, tolylene diisocyanate, methylene bis (4-phenylisocyanate) and the like and mixtures thereof are useful, in combination with high molecular weight polyhydroxy compounds, for the preparation of urethane polymers. Such urethane polymers which may be cellular, rigid or flexible, may be in various shapes or may be in the form of laquers, adhesives, elastomers, or potting compositions for electrical components, etc.

In certain applications of urethane polymers, especially in the manufacture of rigid urethane foam products, for example, urethane foam insulation materials, it is desirable to impart to such products, a high degree of fire-resistance. Such fire-resistance may be imparted to urethane foam products by substituting halogen for one or more of the hydrogren atoms of either the polyisocyanate or the polyol component. Alternately fire-resistance may be imparted to urethane foam materials by adding a fire-retardant to the foam formulation, in an amount sufficient to impart fire-resistance to the urethane foam produced.

Halogen containing polyisocyanates are known in the art. For example the chlorination of phenylene diisocyanates yields products containing one or more chlorine atoms in each molecule. Similarly the chlorination of tolylene diisocyanates is known to yield products containing one or more chlorine atoms. While the conversion of chlorine containing phenylene and tolylene diisocyanates to urethane foams does yield products of improved fire-resistance as compared to foams derived from the non-chlorinated parent phenylene and tolylene diisocyanates, the foams derived from such chlorine containing polyisocyanates are not sufficiently fire resistant, in other words, they are not self-extinguishing until a high chlorine content is achieved. At these high chlorine levels, foams derived from such chlorinated products are undesirably friable, that is they are crumbly and do not possess any stress resistance. In addition, foams derived from these chlorinated phenylene and tolylene diisocyanates tend to be discolored, the discoloration being more pronounced the larger the section of foam being manufactured until complete burnout occurs at the center of the foam being produced. Another disadvantage, peculiar to chlorinated tolylene diisocyanates, is that at high chlorine levels, i.e. above about 30% appreciable chlorination of the methyl substituent occurs thereby producing a reactive chloromethyl or dichloromethyl substituted product. Foams otbained from such products generate hydrogen chloride on storage under hot humid conditions, which deteriorates the foam still further and which is extremely corrosive to many neighboring structures.

It is, therefore, an object of the present invention to prepare halogenated polyisocyanate compositions which yield fire-resistant cellular urethane products. It is another object of the present invention to prepare chlorinated polyisocyanate compositions which yield self-extinguishing rigid cellular urethane products. It is another object of the present invention to prepare chlorinated polyisocyanate compositions which yield fire-resistant cellular urethane products which do not discolor or do not deteriorate during the foaming process. It is yet another object of the present invention to prepare halogenated polyisocyanate compositions which yield self-extinguishing cellular urethane products of excellent physical characteristics. Still another object of the present invention is to prepare chlorinated polyisocyanate compositions which yield self-extinguishing cellular urethane products having good dimensional stability under adverse weathering conditions.

These and other objects of the present invention will become obvious from the following detailed description thereof.

We have discovered that novel chlorinated polyisocyanate compositions useful in the production of valuable fire-resistant cellular urethane products can be prepared by clorination of an undistilled toluenediamine phosgenation product such as disclosed in French Patents 1,375,-975 and 1,376,226. We prefer to use such phosgenation products which have an amine equivalent between about 90 and about 135 and a viscosity between about 20 and about 10,000 cps. at about 25° C. Such products are prepared by phosgenating a solution of a mixture of about 80% 2,4-toluenediamine and about 20% 2,6-toluenediamine in an inert solvent and then distilling said inert solvent and tolylene diisocyanates from the phosgenation mixture until a phosgenation residue is obtained comprising a tolylene diisocyanate solution of non-volatile polyisocyanate solutes, that is, solutes having a boiling point in excess of about 200° C. at about 1 mm. Hg, which solutes are chemically related to and mostly derived from toluenediamines and tolylene diisocyanates. Specially, we have discovered that chlorination of toluenediamine phosgenation products such as disclosed in the above mentioned French patents, in the absence of a chlorination catalyst and at chlorination temperature of about 70 to about 170° C., until a chlorination level corresponding to from about 10 to about 30 weight percent chlorine is attained in said phosgenation products, yields chlorinated polyisocyanate compositions valuable in the production of fire-resistant cellular urethane materials combining other desirable physical and chemical properties.

The novel chlorinated polyisocyanate compositions of our present invention may be prepared by introducing chlorine gas into a well-stirred polyisocyanate composition of the type described above while maintaining said composition at a predetermined temperature, optionally in the presence of a solvent inert to the action of chlorine until the desired amount of chlorine has been introduced into the polyisocyanate composition. The novel chlorinated polyisocyanate compositions of our present invention may also be prepared by introducing chlorine gas and a toluenediamine phosgenation composition as described above, into a suitable mixing device under conditions of turbulence so as to insure intimate co-mingling of the reactants and rapid diffusion of by-product hydrogen chloride away from the chlorination mass. Alternately, the reactants may be introduced in a counter-current or con-current fashion in a corrosion-resistant reaction tower. Alternately the toluenediamine phosgenation products may be injected into a reactor filled with the halogen so as to impinge upon the surface of the reactor thereby exposing a large area of the liquid phosgenation mass to the action of chlorine or the polyisocyanate composition may be injected downwards, in the form of a highly dispersed jet, into a reaction zone traveled upwards by the halogen at high velocity.

The chlorine content of a polyisocyanate composition of our invention may be varied depending upon the degree of fire-retardance desired in the foam derived from said composition. We have discovered that a minimum of about 10 weight percent chlorine is required in a polyisocyanate composition of our invention for the appearance of substantial fire resistance properties in a foam derived from such compositions using conventional foam systems, that is foam systems known in the art of urethane chemistry and devoid of fire retardant additives. Generally, as the chlorine content of the polyisocyanate composition of our invention is increased, the fire-resistance properties of the foams derived therefrom improve until at chlorination levels of about 25 weight percent or higher and depending upon the chlorination conditions employed in producing the chlorinated polyisocyanate compositions, foams derived therefrom become self-extinguishing. At chlorination levels substantially in excess of about 30 weight percent chlorine, polyisocyanate compositions are obtained which produce foams which, while being self-extinguishing, nevertheless possess properties which are so undesirable as to render the foams of no commercial value. Thus, such foams have a low friability rating, that is, they do not possess a fine uniform cell structure and crumble under stress. In addition, such foams are unstable on storage, particularly under adverse weathering conditions. For example, such foams, on storage at 70° C. and 100 percent relative humidity for 24 hours undergo pronounced decomposition reflected in an appreciable change in the dimensions of the foam. Furthermore, such foams, on storage, release hydrogen chloride gas which accelerates decomposition and deterioration of the foam and which rapidly corrodes susceptible neighboring structures. The instability of such foams derived from chlorinated polyisocyanates and containing substantially more than 30 weight percent chlorine, is attributable to the occurrence, in these highly chlorinated polyisocyanates, of substantial chlorine substitution at the methyl groups of the polyisocyanate, thereby producing highly reactive and easily hydrolyzable benzyl and benzal chloride groups, reflected in a high hydrolyzable chlorine content.

As already indicated, the physical properties, such as friability, and the chemical properties, such as fire-resistance and dimensional stability, of the foams derived from the chlorinated polyisocyanate composition of our invention are markedly influenced by the position which chlorine atom occupies in the chlorinated polyisocyanate composition from which said foam is derived. Specifically, a chlorine substituent may occupy any one of several positions, indicated as A or B in structures 1 or 2 of the polyisocyanate molecule. In the two structures, all of the positions designated as A are not exactly equivalent chemically

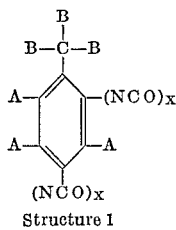

Structure 1

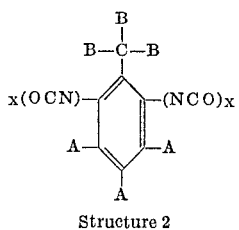

Structure 2 and all of the positions designated as B are not exactly equivalent chemically. However, the difference in reactivity among substituents at A position is slight as compared to the difference in reactivity between a substituent at a position A and one at a position B, so that for all practical purposes only two types of chlorine substituents, namely aromatic chlorine substituents of type A and alpha chlorine substituents of type B, need be considered in determining the effect of the location of a chlorine substituent in the chlorinated polyisocyanate molecule on the properties of the urethane foam derived from said chlorinated polyisocyanate. In the structures, the isocyanate groups are parenthesized to indicate that they may be present as such, for example as in free tolylene diisocyanate or that they may be part of a dimeric, trimeric or higher polymeric structure, such as a uretdione, an isocyanate or more complex structure. It is believed that the effect of a chlorine atom on the properties of a urethane foam derived from a chlorinated polyisocyanate of our invention will depend upon the position of said chlorine atom, that is, whether it is attached to a position A or B, in the chlorinated polyisocyanate molecule, and to a somewhat lesser extent upon whether a neighboring isocyanate group is present as such or as a part of a more complex structure. We have discovered that in order to obtain a foam combining fire-resistance with optimum physical and chemical properties for a particular chlorine content, the chlorination conditions should be such that a minimum of chlorine atoms is introduced at the alpha positions in the polyisocyanate compositions.

We have discovered that at chlorination levels corresponding to about 10 to 30 weight percent chlorine in the chlorinated polyisocyanate compositions of our invention, it is most advantageous to have the chlorine substituents distributed so that a minimum of 60 percent and preferably 80 percent of the total chlorine is of the aromatic (A type) type.

The importance of minimizing substitution of chlorine atoms at the alpha positions may be understood if one considers that a carbon-B type chlorine bond is of relatively low activation energy and may therefore be dissociated more readily than a carbon-A type chlorine bond, so that a foam containing a large number of carbon-B type chlorine bonds will be inherently less stable than a foam containing an identical number of carbon chlorine bonds of the A type. On the other hand, at identical chlorination levels, a chlorinated polyisocyanate composition of our invention containing a large number of alpha chlorines yields a foam of better fire-retardance than that obtained from a chlorinated polyisocyanate containing a smaller number of said alpha chlorines. Unfortunately, the presence of large amounts of alpha chlorine substituents in the chlorinated polyisocyanate compositions of our invention causes, due to the relatively high reactivity of such chlorine substituents, undesirable properties in the foams derived therefrom, primarily dimensional instability, corrosive action and burn-out.

The degree of B type or alpha substitution in a chlorinated polyisocyanate composition of our invention is determined by subjecting a sample of the composition to hydrolysis under relatively mild conditions which cause hydrolysis of alpha (B type) chlorine but not of aromatic (A type) chlorine substituents.

The dimensional instability and corroding action of a foam derived from a chlorinated polyisocyanate of our invention may be related to the hydrolyzable chlorine content of said chlorinated polyisocyanate composition, that is, as the hydrolyzable chlorine and therefore B type chlorine content of the polyisocyanate increases, the dimensional stability of a foam derived from said composition decreases while its corrosive action and friability increase. Conversely at identical chlorination levels, as the aromatic chlorine content of a chlorinated polyisocyanate composition of our invention increases, the dimensional stability and friability of foams derived therefrom are improved. For the preparation of foams having acceptable physical and chemical properties, the relative concentration of aromatic chlorine substituents in the chlorinated composition should correspond to at least about 60 weight percent of the total chlorine content of said composition, and preferably to at least about 80 weight percent of said total chlorine content. The remainder of the chlorine content, that is the hydrolyzable chlorine content, of a chlorinated polyisocyanate composition of our invention, is present mostly in the form of alpha chlorine substituents and in the form of loosely bound hydrogen chloride such as is present in carbamyl chlorides.

We have discovered that the relative distribution of chlorine substituents at positions of type A or type B in the chlorinated polyisocyanate compositions of our invention is markedly influenced by the chlorination temperature. For example as the chlorination temperature is increased, particularly above about 140° C., the degree of alpha chlorination increases. Thus, while for the preparation of useful fire resistant urethane foams from the chlorinated polyisocyanate compositions of our invention, the chlorinated polyisocyanates may be prepared at chlorination temperatures of about 70 to about 170° C., we prefer to maintain chlorination temperatures between about 85 and about 130° C. At such temperatures the hydrolyzable chlorine content of our polyisocyanates is relatively low, so that foams derived therefrom combine good fire-resistance with outstanding physical and chemical properties. Furthermore, while chlorination temperatures below about 70° C. also produce chlorinated polyisocyanate compositions of low alpha chlorine content, at such temperatures, hydrogen chloride by-product adds to the isocyanate groups of the polyisocyanate molecules thereby producing insoluble carbamyl chlorides which have to be dissociated to the corresponding reactive isocyanates by subsequent heating. In addition, at chlorinated temperatures of about 70 to about 170° C., chlorinated polyisocyanate compositions are prepared which have viscosities sufficiently low to permit handling such compositions in conventional foaming machines. The chlorinated polyisocyanate compositions of our invention generally have viscosities in the range of about 100 to about 3000, compositions having viscosities near 3000 being obtained at the higher chlorination levels.

It is important, in the preparation of the chlorinated ployisocyanate compositions of our invention, not to employ chlorination temperatures in excess of about 170° C., in order to avoid dimerization and trimerization reactions which produce uretdione and triisocyanurate groups, thereby reducing the concentration of reactive isocyanate components in the chlorinated compositions of our invention. For the successful application of the compositions of our invention in the production of urethane foams by conventional foaming techniques, it is desirable that the compositions have an isocyanate content corresponding to a corrected amine equivalent of about 110 to 150, determined as outlined below. Such compositions contain a sufficient concentration of isocyanate groups to permit their efficient utilization in the production of rigid urethane foams by one-shot foaming techniques.

Surprisingly, we also discovered that the fire-resistant properties of a foam obtained from a chlorinated polyisocyanate composition of our invention, depends upon the concentration of non-volatile components in the chlorinated polyisocyanate composition. That is, a foam derived from a chlorinated polyisocyanate obtained from a polyisocyanate containing a low concentration of non-volatile solutes will be less fire-resistant than an otherwise identically prepared foam derived from a polyisocyanate similarly chlorinated, but initially containing a higher concentration of non-volatile components. We have discovered that the concentration of non-volatile components in the chlorinated polyisocyanates of our invention increases if the chlorination is conducted at high temperatures and using relatively long reaction times. For example, at chlorination temperatures substantially in excess of those employed in the process of our invention, that is an excess of about 170° C., chlorinated polyisocyanates are obtained which contain high concentrations of non-volatiles resulting in the production of chlorinated polyisocyanates of high viscosity, which are difficult to process in commercial foaming machines. Such compositions also yield foams of pronounced friability and poor dimensional stability due to substantial alpha chlorination.

Proper control of the chlorination rate, namely the amount of chlorine introduced into the polyisocyanate mass, per unit weight of polyisocyanate per unit time, also affects the properties of the chlorinated polyisocyanate products of our invention. Thus, to obtain chlorinated polyisocyanates of useful viscosity ranges, which yield urethane products having desirable commercial properties, the chlorination process is preferably conducted in a short time at the highest practical chlorine feed rate.

We prefer to carry out the chlorination process of our invention in the absence of a halogenation catalyst, in order to obtain halogenated polyisocyanate of a viscosity sufficiently low, about 50 to about 5000 cps. at about 25° C. to permit handling in conventional foaming machines. Thus a chlorinated polyisocyanate obtained by the process of our invention will generally have a viscosity between about 100 and 3000 centipoises at about 25° C., whereas a chlorinated polyisocyanate obtained similarly, but in the added presence of about 1 percent of a halogenation catalyst such as antimony trichloride, will have a viscosity of the order of several thousand centipoises at about 25° C. and cannot be handled conveniently in a conventional foaming machine. Additionally, foams derive from chlorinated polyisocyanate compositions prepared in the presence of halogenation catalysts exhibit severe burn-out.

In an actual embodiment of the process of our invention the polyisocyanate composition to be chlorinated is placed in a suitable reactor, equipped with an agitator, and treated with gaseous chlorine, at a nearly fixed rate measured by means of a gas metering device, while the reaction is held at the desired chlorination temperature by external cooling at first, and later by heating after the initial exothermic reaction has subsided, until a predetermined increase in the weight of the sample being chlorinated is observed, corresponding to the desired degree of chlorination. Upon completion of the chlorination process, the chlorinated product may be swept with a stream of inert gas, such as nitrogen, to remove unreacted chlorine and by-product hydrogen chloride and/or finally subjected to a vacuum degassing process at elevated temperatures to remove any residual chemically bound hydrogen chloride. The chlorinated product may then be employed, as such, or in admixture with other polyisocyanate, in the production of urethane foam polymers.

AMINE EQUIVALENT

For the purposes of our invention, amine equivalent is defined as the weight in grams of the polyisocyanate composition containing one isocyanate group.

An apparent amine equivalent is determined experimentally by an analytical method which comprises reacting the isocyanate groups in the sample with an excess of n-dibutylamine to form urea groups, then back titrating the unreacted dibutylamine with standard hydrogen chloride solution. About 6 to 8 grams of sample are diluted with 35 to 50 cc. toluene and 20 cc. of a 2 N solution of dibutylamine in toluene. The mixture is heated for about 5 to 10 minutes at just below the boiling point, cooled and titrated, in the presence of 100 cc. methanol, with 1 N hydrogen chloride to pH 4.2 to 4.5. For better accuracy, a blank from which only the isocyanate composition has been omitted is run simultaneously. The apparent amine equivalent is calculated using the following equation:

$$A = \frac{1000S}{(ml.\ B - ml.\ S)N}$$

wherein $A$ = apparent amine equivalent,
$S$ = sample weight, in grams,
ml. $B$ — ml. HCl required for blank titration
ml. $S$ = ml. HCl required for sample back titration
and $N$ — normality of HCl.

The apparent amine equivalent is converted to an actual corrected amine equivalent, by inserting into the above equation a correction factor, due to the consumption of a portion of the dibutylamine titer by the hydrogen chloride and other acidic components originally present in the chlorinated polyisocyanate sample or formed by hydrolysis of the alpha chlorine atoms during the procedure. The corrected amine equivalent is calculated using the folllowing equation:

$$C = \frac{1000 S}{(\text{ml. } B - \text{ml. } S)N - \text{meq. } H}$$

wherein $C$ = corrected amine equivalent,
meq. $H$ = milliequivalents of HCl due to hydrolyzable chlorine content,
and S, ml. B, ml. S and N have the values indicated above.

An identical corrected amine equivalent value C may also be calculated by the following equation which is obtained by modification of the above equation:

$$C = \frac{A}{100 - \left(\frac{\text{percent } H}{35.5}\right)}$$

wherein percent H is the percent hydrolyzable chlorine content of the sample and 35.5 is the equavalent weight of chlorine.

HYDROLYZABLE CHLORINE CONTENT

Approximately one gram of the chlorinated polyisocyanate composition to be analyzed is mixed with 50 ml. of anhydrous methanol and heated to a gentle boil for two minutes after which 200 ml. boiling water are added. The mixture is then heated at the boiling point for 30 minutes, cooled, treated with 0.5 ml. concentrated nitric acid and titrated potentiometrically with 0.1 N silver nitrate using Ag/AgCl electrodes. The hydrolyzable chlorine content of the sample is calculated using the equation:

percent hydrolyzable chlorine =

$$\frac{\text{ml. AgNO}_3 \times N \times 35.456 \times 100}{S \times 1000}$$

wherein

N is the normality of the AgNO$_3$ used and
S is the sample weight.

The following examples illustrate certain preferred embodiments of our invention. It is to be understood, however, that the examples are merely for the sake of illustration and that the invention is not to be regarded as limited to any of the specific details recited therein, except as defined in the appended claims. In the examples, parts and percentages are by weight and the temperatures are given in degrees centigrade.

EXAMPLE 1

A solution of five hundred parts of a polyisocyanate composition (Nacconate 4040) having an amine equivalent of 108.5, a hydrolyzable chlorine content of 0.23 percent and a viscosity of 62 cps. at 26° C., in 1500 parts tetrachloroethane is treated with chlorine for about 4 hours, initially at a temperature of about 80° C. which is gradually increased during the chlorination process to a maximum temperature of about 113° C., after which the reaction mixture is treated with dry nitrogen gas for about 3 hours at a temperature of about 96–100° C. to remove unreacted chlorine and by-product hydrogen chloride. The degassed reaction mixture is stripped of tetrachloroethane solvent to yield a product having an amine equivalent of 123.4, a total chlorine content of 20.8 percent of which 2.45 percent is hydrolyzable chlorine, corresponding to an aromatic chlorine content of about 89.7 percent of the total chlorine content. The corrected amine equivalent for the reaction mixture is 139.

The reaction mixture on gas chromatographic analysis is found to contain 78 percent monochlorinated, 21 percent dichlorinated and trichlorinated, and 1 percent unchlorinated polyisocyanates.

EXAMPLE 2

Eighteen hundred parts of a polyisocyanate composition prepared according to the process of French Patent 1,376,226 and having an amine equivalent of 105.8, a viscosity of 54 centipoises at 25° C. and a titratable chlorine content of 0.2 percent is treated at about 145° C. with a stream of chlorine, at the rate of 4.9 parts chlorine per minute, for about 4.3 hours. The mixture is then heated at about 174–176° C. for one hour while a stream of dry nitrogen is bubbled below the surface of the reaction mixture to remove unreacted chlorine and by-product hydrogen chloride. On cooling there is obtained a chlorinated polyisocyanate composition containing 25.4 percent chlorine, of which 9.86 is hydrolyzable chlorine, corresponding to an aromatic chlorine content of 61.2 percent of the total chlorine content. The product has a viscosity of 1870 centipoises at 25° C., an apparent amine equivalent of 96.9 and a corrected amine equivalent of 131.

The product, on conventional foaming with a commercial polyoxypropylene polyol (Actol 52–460), yields a fire-resistant rigid foam having a burning rate of 5.2 inches per minute as measured by ASTM D 1692–59T, Tentative Method of Test for Flammability of Plastic Foams and Sheeting.

EXAMPLE 3

The process of Example 2 is repeated except that the chlorination temperature is reduced to about 105–107° C. and the chlorination time is reduced to 3 hours. There is obtained a chlorinated polyisocyanate composition containing 24.1 percent chlorine, of which 4.01 is hydrolyzable chlorine, corresponding to an aromatic chlorine content of 83.4 percent of the total chlorine content. The product has a viscosity of 1424 cps. at about 25° C. an apparent amine equivalent of 119.2 and a corrected amine equivalent of 124. Comparison of Examples 2 and 3 shows that the relative concentration of hydrolyzable chlorine increases as the chlorination temperature is increased.

EXAMPLE 4

The process of Example 3 is repeated except that the chlorination time is reduced to 2 hours. There is obtained a chlorinated polyisocyanate composition containing 16.1 percent total chlorine, of which 5.39 percent is hydrolyzable chlorine, corresponding to an aromatic chlorine content of 66.5 percent of the total chlorine content. The product has a viscosity of 528 cps. at 25° C., an apparent amine equivalent of 107 and a corrected amine equivalent of 126. Comparison of examples 3 and 4 shows that a constant chlorination temperature of 105–107° C., the relative concentration of aromatic chlorine decreases with a decrease in the total chlorine content of a polyisocyanate composition of our invention.

Example 5

Eighteen hundred parts of a polyisocyanate composition prepared according to the process of French Patent 1,375,975 and having an amine equivalent of 107.5 and a viscosity of 68 cps. at about 25° C. is treated with chlorine at the rate of 4 parts per minute, for about 3 hours, at an initial reaction temperature of 40° C. The reaction temperature rises rapidly and requires external cooling so as to maintain the reaction mixture at the desired 90–92° C. temperature range. Upon completion of the chlorination, the reaction mixture is gradually heated to 175° C. while dry nitrogen gas is introduced below the surface of the reaction mixture, in order to remove unreacted chlorine and by-product hydrogen chloride. On cooling there is obtained 2125 parts of product, corresponding to 96 percent chlorine utilization, having a viscosity of 448 cps. at about 25° C. The product contains a small amount of solid which is removed by filtration. Analysis of the reaction product shows that it contains 15.9 percent total chlorine of which only 0.64 is hydrolyzable chlorine, corresponding to an aromatic chlorine content of 95.8 percent of the total chlorine content suggesting that at lower chlorination temperatures most of the chlorine is introduced at aromatic positions. The product has an apparent amine equivalent of 125 and a corrected amine equivalent of 128.

Example 6

The process of Example 2 is repeated except that chlorination is continued until a chlorination level corresponding to 27.4 percent chlorine is obtained. The product contains 10.6 percent hydrolyzable chlorine, corresponding to an aromatic chlorine content of 62.1 percent of the total chlorine content and has an amine equivalent of 95.8 and a corrected amine equivalent of 132. On conventional foaming with Actol 52–460, it yields a foam which is rated as self-extinguishing by ASTM D–1692–59T, Tentative Method of Test for Flammability of Plastic Foams and Sheeting.

We claim:
1. Chlorinated aromatic polyisocyanates containing about 10 to about 30 weight percent chlorine, at least 60 percent of said chlorine being substituted on carbons of an aromatic nucleus, having a viscosity at about 25° C. of 50 to about 5000 cps. and a corrected amine equivalent of about 110 to 150, prepared by chlorinating, at temperatures of from about 70° to 170° C. a toluenediamine phosgenation product having an amine equivalent between about 90 and about 135 and a viscosity between about 20 and about 2000 cps. at about 25° C. said phosgenation product having been prepared by phosgenating a solution of a mixture of about 80% 2,4-toluenediamine and about 20% 2,6-toluenediamine, in an inert solvent, and then distilling said solvent and tolylene diisocyanates from the phosgenation mixture until a toluenediamine phosgenation product is obtained, comprising a tolylene diisocyanate solution of non-volatile solutes, said solution having an amine equivalent and a viscosity in said amine equivalents and viscosity ranges, until a chlorination level of about 10 to about 30 weight percent is attained.

2. The polyisocyanate of claim 1 containing 16 to about 26 weight percent chlorine wherein from about 60 to 80% of said chlorine is substituted on the carbons of the aromatic nucleus.

3. The polyisocyanate of claim 1 having a viscosity ranging from about 100 to 3000 cps. at about 25° C.

4. A process for the production of chlorinated aromatic polyisocyanate compositions which comprises
(a) introducing elemental chlorine, in the absence of a chlorination catalyst, and at a chlorination temperature of about 70 to about 170° C., into a toluenediamine phosgenation product having an amine equivalent between about 90 and about 135 and a viscosity between about 20 and about 2000 cps. at about 25° C. and prepared by phosgenating a solution of a mixture of about 80% 2,4-toluenediamine and about 20% 2,6-toluenediamine, in an inert solvent, and then distilling said inert solvent and tolylene diisocyanates from the phosgenation mixture until a toluenediamine phosgenation product is obtained, comprising a tolylene diisocyanate solution of non-volatile solutes, said solution having an amine equivalent and a viscosity in said amine equivalent and viscosity ranges, until a chlorination level corresponding to from about 10 to about 30 weight percent chlorine is attained,
(b) introducing an inert gas under the surface of the chlorination mass, to remove unreacted chlorine and by-product hydrogen chloride from the chlorination mixture,
(c) subjecting the chlorination mixture to vacuum, at a temperature and for a time sufficient to cause nearly complete evolution of gases remaining in said chlorination mixture, and
(d) cooling the chlorination mixture so as to recover a chlorinated polyisocyanate composition, said chlorinated composition having a corrected amine equivalent of about 110 to 150, a viscosity of about 100 to about 3000 centipoises at about room temperature and an aromatic chlorine content corresponding to at least 60 percent of the total chlorine content.

5. The process of claim 4 wherein said chlorine is introduced at a temperature ranging from about 85° C. to about 130° C.

6. The process of claim 4 wherein said chlorine is introduced at the rate of at least about 4 parts per minute for a period of time ranging from about 2 to about 5 hours.

References Cited

UNITED STATES PATENTS

| 2,945,875 | 7/1960 | Tazuma | 260—453 |
| 3,277,138 | 10/1966 | Holtschmidt et al. | 260—453 |
| 3,316,286 | 4/1967 | Kaplan | 260—453 |
| 3,317,481 | 5/1967 | Youker | 260—453 XR |

CHARLES B. PARKER, *Primary Examiner.*

D. H. TORRENCE, *Assistant Examiner.*